(12) United States Patent
Oka et al.

(10) Patent No.: US 9,488,845 B2
(45) Date of Patent: Nov. 8, 2016

(54) DISPLAY DEVICE

(71) Applicant: Japan Display Inc., Tokyo (JP)

(72) Inventors: Shinichiro Oka, Tokyo (JP); Takeo Koito, Tokyo (JP); Yingbao Yang, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/552,521

(22) Filed: Nov. 25, 2014

(65) Prior Publication Data

US 2015/0153578 A1  Jun. 4, 2015

(30) Foreign Application Priority Data

Nov. 27, 2013 (JP) .................. 2013-245147

(51) Int. Cl.
*G02B 27/22* (2006.01)
*G02F 1/1343* (2006.01)
*G02B 27/00* (2006.01)
*G02F 1/29* (2006.01)

(52) U.S. Cl.
CPC ....... *G02B 27/2214* (2013.01); *G02B 27/0093* (2013.01); *G02F 1/134309* (2013.01); *G02F 1/29* (2013.01)

(58) Field of Classification Search
CPC .......... G02B 27/2214; G02B 22/0093; G02F 1/13471; G02F 1/134309
See application file for complete search history.

(56) References Cited

U.S. PATENT DOCUMENTS

| 5,493,427 | A | 2/1996 | Nomura et al. |
| 6,436,093 | B1* | 8/2002 | Ruiz .................. A61F 9/00808 |
| | | | 606/4 |
| 2003/0128325 | A1* | 7/2003 | Yun .................. G02F 1/133707 |
| | | | 349/143 |
| 2008/0218459 | A1* | 9/2008 | Kim ...................... G02F 1/1323 |
| | | | 345/87 |

FOREIGN PATENT DOCUMENTS

JP  7-72445 A  3/1995

* cited by examiner

*Primary Examiner* — Anne Hines
(74) *Attorney, Agent, or Firm* — Typha IP LLC

(57) ABSTRACT

A liquid crystal lens is formed with a first electrode formed on a first substrate and two or more second electrodes formed on a second substrate in a stripe pattern. Different voltages are applied to the second electrodes. The plurality of second electrodes exist at the boundary between a first liquid crystal lens and a second liquid crystal lens, and accept the maximum voltage of the different voltages. As a result, the liquid crystal lens can be moved in accordance with the movement of the visual line, the first and second liquid crystal lenses can be separated, and also a refractive index distribution of the liquid crystal lens can be close to a quadratic curve, thereby enabling to prevent the crosstalk.

6 Claims, 15 Drawing Sheets

|  | CROSSTALK |
|---|---|
| SINGLE ELECTRODE | 1.8% |
| MULTI-ELECTRODE (FIG19) | 1.2% |
| MULTI-ELECTRODE (FIG1) | 0.6% |

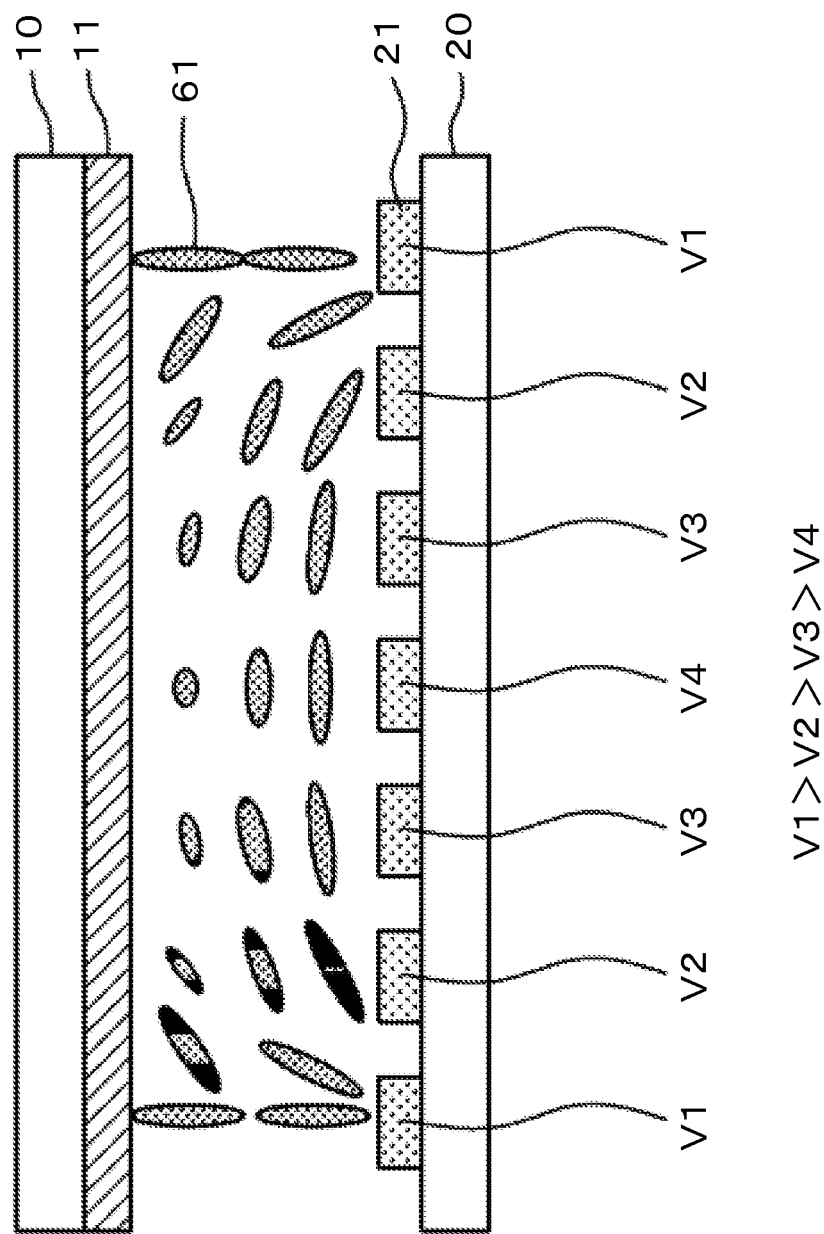

DISPLAY DEVICE

CLAIM OF PRIORITY

The present application claims priority from Japanese Patent Application JP 2013-245147 filed on Nov. 27, 2013, the content of which is hereby incorporated by reference into this application.

FIELD OF THE INVENTION

The present invention relates to a display device, and, more particularly, to a three-dimensional display device with an arranged liquid crystal lens having a lens function on the side of the display surface of the liquid crystal display panel.

BACKGROUND OF THE INVENTION

Some display devices can switch between three-dimensional (3D) display and two-dimensional (2D) display with naked eyes without using any glasses. The display devices are configured to include, for example, a first liquid crystal display panel which performs image display and a second liquid crystal display panel. The second liquid crystal display panel is arranged on the side of the display screen (the side of the observer) of the first liquid crystal display panel, and forms a parallax barrier for causing incidence of light independently for the right and left eyes of the observer at the 3D display. In this liquid crystal display device which can switch between the 2D display and the 3D display, the alignment of liquid crystal molecules in the second liquid crystal display panel is controlled. By so doing, the refractive index in the second liquid crystal display panel is changed, there is formed a lens (lenticular lens or cylindrical lens array) area which is extended in a vertical direction of the display screen and parallel to a crosswise direction, and the light of pixels corresponding to the right and left eyes is delivered to the visual point of the observer.

In the 3D image display device using the liquid crystal display lens, when the visual line has been moved, the crosstalk occurs between pixels for left eye and pixels for right eye, causing a problem of deteriorating the 3D image. To solve this problem, Japanese Unexamined Patent Application Publication No. Hei 7-72445 discloses a configuration to detect a spatial position of the head part of the observer, and to change the lens characteristics based on the detected position information of the head part.

FIG. 10 is a schematic cross sectional view of a three-dimensional image display device using a liquid crystal lens 100. In FIG. 10, the liquid crystal lens 100 and a display device 200 are adhered to each other through an adhesive member 300. The adhesive member 300 is a transparent member, and is formed using, for example, a UV (ultraviolet) curing resin. The display device 200 is formed using a liquid crystal display panel, an organic EL display panel, or the like.

FIGS. 11A and 11B are plan views of a liquid crystal lens corresponding to a part B-B' in FIG. 10. In FIGS. 11A and 11B, a first substrate 10 is covered with a first electrode 11, over the entire surface of the display region. A pectinate second electrode 21 is formed on a second substrate 20, and one ends of the second electrode 21 are connected each other through a bus electrode.

FIG. 12 is a cross sectional view illustrating a configuration of a conventional liquid crystal lens corresponding to a sectional part A-A' of FIG. 11B. In FIG. 12, the first electrode 11 is formed in a flat solid manner inside the first substrate 10 as a transparent substrate, and a first alignment film 12 is formed on the first electrode 11. The stripe-shaped (pectinate) second electrode 21 is formed inside the second substrate 20 as a transparent substrate, and a second alignment film 22 is formed to cover the electrode 21. The alignment direction of the first alignment film 12 and the alignment direction of the second alignment film 22 are the same. The first substrate 10 and the second substrate 20 are preferably formed with a glass substrate, or may be formed with a transparent plastic substrate. A liquid crystal layer 60 is sandwiched between the first substrate 10 and the second substrate 20.

In FIG. 12, the liquid crystal has positive dielectric anisotropy. In the three-dimensional image display device using the liquid crystal lens, it is possible to perform three-dimensional image display upon application of a voltage between the first electrode 11 and the second electrode 21. It is possible to perform two-dimensional image display when no voltage is applied between the first electrode 11 and the second electrode 21.

FIG. 13 is a cross sectional view illustrating principles of forming a three-dimensional image using one liquid crystal lens. In FIG. 13, human eyes recognize an image formed in the display device 200 through liquid crystal lenses 101. In FIG. 13, an image for right eye is "R", while an image for left eye is "L". In FIG. 13, the pitch of the liquid crystal lenses 101 is "Q", and the pixel pitch of the display device 200 is "P". The distance (i.e., interocular distance) between the center of the human left eye and the center of the right eye is "B". In general, the interocular distance "B" is assumed as 65 mm. The pitch "Q" of the liquid crystal lenses, the pixel pitch "P" of the display device, and the interocular distance "B" are in a relationship as follows (equation 1).

[Equation 1]

$$Q = \frac{2P}{(1 + P/B)} \quad (1)$$

FIGS. 14A, 14B, 14C are cross sectional views illustrating principles of a liquid crystal lens. When a voltage is applied between the first electrode 11 and the second electrode 21, the line of electric force F is generated, as illustrated in FIG. 14A. When no voltage is applied between the first electrode 11 and the second electrode 21, the liquid crystals are horizontally aligned, as illustrated in FIG. 14B. In the illustration of the present application, the pretilt angle is ignored for prevention of complexity.

When a voltage is applied between the first electrode 11 and the second electrode 21, as illustrated in FIG. 14C, liquid crystal molecules 61 rise above the second electrodes 21, and the liquid crystal molecules 61 between pectinate electrodes are horizontally aligned. This results in a distribution of the refractive index, and results in a refractive index distribution type (GRIN: Gradient Index) lens.

The general conventional liquid crystal lens is one as illustrated in FIG. 11A to FIG. 14C. As illustrated in FIG. 14C, in the configured liquid crystal lens, disclination 80 occurs at the upper part of the pectinate electrode. This results in a problem that incident light is scattered at the upper part of the electrode, and the crosstalk increases. In this case, the disclination 80 implies the line of discontinuity resulting in the arrangement of the liquid crystal molecules, while the crosstalk implies that the image for left eye and the image for right eye are not sufficiently separated. Note that, if the crosstalk is high, it is seen simply as a doubly reflected image, instead of a three-dimensional image.

On the contrary, as illustrated in FIG. 15A and FIG. 15B, the alignment of the liquid crystal molecules in the liquid crystal lens is TN (Twisted Nematic) alignment. A polarizing plate 13 is arranged on the side opposite to the arrangement side of the liquid crystal on the second substrate 20, thereby possibly shading the disclination part. Thus, the crosstalk can possibly be reduced. In this case, the TN is approximately 90 degree twisted alignment. That is, in FIG. 15A, the alignment direction of a non-illustrated first alignment film formed on the first substrate 10 is 90 degrees from the alignment direction of a non-illustrated second alignment film formed on the second substrate 20. This mechanism will hereinafter be described.

FIG. 15A illustrates a state where no voltage is applied between the first electrode 11 and the second electrode 21. At this time, the liquid crystal lens unit includes normally open type TN liquid crystals. Thus, the image from the display device is not subject to any effect. FIG. 15B illustrates a case where a voltage is applied between the first electrode 11 and the second electrode 21. The liquid crystals are aligned in a manner that the lens is formed between the pectinate electrode and the pectinate electrode, as the second electrodes 21. Above the second electrodes 21, the line of electric force F is in a perpendicular direction to the second electrodes 21. Thus, the liquid crystal molecules 61 are also perpendicular thereto. That is, in this part, the light from the display device is absorbed by the polarizing plate 13, and thus is not transmitted. That is, it is possible to prevent the crosstalk.

In FIGS. 15A and B, in the polarizing plate 13, it is preferred that the transmission axis be approximately 90 degrees with respect to the polarization direction of the emission from the display device. If the display device is a liquid crystal display device, the emitted light is polarized light. However, if the display device is an organic EL display device, it is necessary to attach a polarizing plate onto the surface of the organic EL display device.

FIGS. 16A and 16B are cross sectional views for explaining this state. FIG. 16A is a cross sectional view illustrating the relationship between the polarization direction of incident light, the polarization direction of emitted light, and the transmission axis of the first polarization plate 13, when no voltage is applied between the first electrode 11 and the second electrode 21. In FIG. 16A, in the case of a liquid crystal lens in TN alignment in its initial alignment, the incident polarized light optically rotates in a liquid crystal layer by 90 degrees, when no voltage is applied. Thus, if the emission polarization direction is an X-axis direction, the polarization direction will be a Y-axis direction at the emission. If the polarization transmission axis of the polarizing plate 13 is in the Y direction, the incident light is transmitted through it. Therefore, in the case of two-dimensional display in which no voltage is applied between the first electrode 11 and the second electrode 21, the liquid crystal lens does not have any effect on the emitted light from the display device.

When a voltage is applied to the TN-aligned liquid crystal lens, the liquid crystal molecules 61 are aligned as illustrated in FIG. 15B. As seen from FIG. 15B, the liquid crystal molecules 61 rise above the second electrodes 21, thus deteriorating the optical rotation. However, around the center between the second electrodes 21 as the pectinate electrodes, the alignment of the liquid crystal molecules 61 is hardly changed from its initial alignment, resulting in optical rotation and rotation of an incident light polarizing axis by 90 degrees. Therefore, light is shaded above the second electrodes 21, while light is transmitted between the second electrodes 21.

FIG. 16B illustrates the above-described contents based on the relationship between the polarizing axes of the incident light and the emitted light. That is, when a voltage is applied between the second electrodes, the polarizing axis of the emitted light right above the second electrodes is in a direction perpendicular to the direction of the polarizing axis of the emitted light between the second electrodes. The polarizing axis of the polarizing plate 13 is in a direction perpendicular to the polarizing axis of the emitted light right above the second electrodes. Thus, the light is not transmitted right above the second electrodes.

FIG. 17 illustrates an example of a transmittance distribution of the TN-aligned liquid crystal lens. In FIG. 17, the horizontal axis represents the position, while the vertical axis represents the transmittance distribution. In the ideal transmittance distribution of FIG. 17, the transmittance will substantially be zero, near the second electrodes 21. However, in the actual TN-aligned liquid crystal lens, a problem is that the transmittance between the liquid crystal lenses cannot sufficiently be lowered, in relation to the electrode width of the second electrodes, the gap between the liquid crystal cells or the like.

In the liquid crystal lens, to attain the lens effect at most, the refractive index distribution preferably becomes a quadratic curve. FIG. 18 is a schematic cross sectional view illustrating an aligned state of the liquid crystal molecules in a conventional liquid crystal lens cell, and also a graph of a refractive index distribution corresponding thereto. In the graph of FIG. 18, symbols C and E correspond to the end part of the liquid crystal lens, while a symbol D corresponds to the center of the liquid crystal lens.

In general liquid crystal lenses, a large phase difference is required to attain the lens effect. Thus, it is necessary to have a certain degree of great interval (i.e. the gap) between substrates of the liquid crystal cells. On the contrary, the interval between the electrodes of the second electrodes 21 is several ten to several hundred μm. It has been understood, based on the previous study, that if the ratio of the gap to the interval between the electrodes is approximately 1:5, a quadratic curve can be attained. Therefore, as illustrated in FIG. 18, if the ratio of the cell gap to the interval between the electrodes is quite far from 1:5, the transmittance distribution is not to have a quadratic curve, in the alignment of the liquid crystal molecules 61. FIG. 18 illustrates a homogeneous-type alignment. However, the same problem occurs in the TN alignment.

As illustrated in FIG. 18, in the specification, the case where a lens is formed using a pair of second electrodes is identified as a single electrode. That is, in a single electrode, it is difficult that the refractive index distribution has a quadratic curve. As illustrated in FIG. 19, instead of forming the liquid crystal lens using a pair of second electrodes, two or more second electrodes 21 are arranged in one lens, and the electric potential of the second electrodes 21 is changed. By so doing, it has been considered that the refractive index distribution becomes closer to the quadratic curve. In FIG. 19, the second electrodes 21 are elongated in a stripe pattern in a vertical direction of the document, and different voltages may be applied respectively to the second electrodes 21.

In FIG. 19, the largest voltage V1 is applied to the electrode formed at the end part of the lens. As being closer to the inside the lens, the voltage to be applied to the electrodes is gradually decreased. That is, $V1>V2>V3>V4$.

Even if two or more second electrodes 21 are arranged in one lens, it is difficult that the refractive index becomes closer to a quadratic curve, because the gap of the liquid crystal cells and the diameter of the lens are largely different. In this specification, a system in which two or more second electrodes are arranged in one lens is identified as a multi-electrode.

SUMMARY OF THE INVENTION

An object of the present invention is to improve the quality of liquid crystal lenses, by lowering the interference between liquid crystal lenses through sufficiently lowering the transmittance between the liquid crystal lenses and by setting the refractive index distribution of the liquid crystal lenses to become closer to a quadratic curve as much as possible. Another object thereof is to realize a three-dimensional image device using a liquid crystal lens in which the crosstalk is not increased, even if the visual line has been moved.

Solution to Problem

To solve the above problem, the main solutions according to the present invention are as follows.

(1) A display device in which liquid crystal lens cells are arranged on a display panel, wherein: the liquid crystal cells have a TN type liquid crystal, which is sandwiched between a first substrate and a second substrate and whose twist angle is 90 degrees; a first electrode is formed in a flat solid manner on a side of the liquid crystal of the first electrode, and a second electrode is in a stripe pattern as seen in plane on a side of the liquid crystal of the second substrate; and a plurality of liquid crystal lenses are formed in the liquid crystal cells, and are formed using the first electrode and two or more second electrodes applying different voltages, and a plurality of second electrodes exist at boundary between a first liquid crystal lens and a second liquid crystal lens, and accept an applied maximum voltage of the different voltages.

(2) The display device according to (1), comprising: a position detecting unit which detects positions of human eyes and forms position information; and a second electrode control unit which forms a voltage to be applied to the second electrodes based on the position information.

(3) A display devices in which liquid crystal cells are arranged on a display panel, wherein: the liquid crystal lens cells have a TN type liquid crystal, which is sandwiched between a first substrate and a second substrate and whose twist angle is 90 degrees; a first electrode is formed in a flat solid manner on a side of the liquid crystal of the first electrode, an upper layer second electrode is in a stripe pattern as seen in plane on a side of the liquid crystal of the second substrate, and a lower layer second electrode is formed below the upper layer second electrode through an insulating layer; the lower layer second electrodes exists between the upper layer second electrode and the upper layer second electrode, as seen from the first electrode; the liquid crystal lens cells include a plurality of liquid crystal lenses, which are formed using the first electrode, two or more upper layer second electrodes applying different voltages and two or more lower layer second electrodes applying different voltages, and a plurality of upper layer second electrodes and lower layer second electrodes exist at boundary of a first liquid crystal lens and a second liquid crystal lens, and accept an applied maximum voltage of the different voltages.

(4) The display device according to (3), wherein a space between the upper layer second electrode and the upper layer second electrode is filled entirely with the lower layer second electrode, as seen from the first electrode.

(5) The display device according to (3), wherein a voltage of the lower layer second electrode is equal to a voltage of the upper left upper layer second electrode seen from the lower layer second electrode.

(6) The display device according to (3), comprising: a position detecting unit which detects positions of human eyes and forms position information; and a second electrode control unit which forms a voltage to be applied to the upper layer second electrode and the lower layer second electrode based on the position information.

Advantageous Effect of Invention

According to the present invention, in the three-dimensional display device using the liquid crystal lenses, the crosstalk can be reduced. Even when the visual line has been moved, the increase of the crosstalk can be minimized.

BRIEF DESCRIPTION OF DRAWINGS

FIG. 19 is a cross sectional view of a liquid crystal lens cell in which a liquid crystal lens is formed with a plurality of (two or more) second electrodes, corresponding to one liquid crystal lens.

DESCRIPTION OF THE PREFERRED EMBODIMENTS

Descriptions will hereinafter be made to the present invention using the preferred embodiments.

First Embodiment

Figure 1:
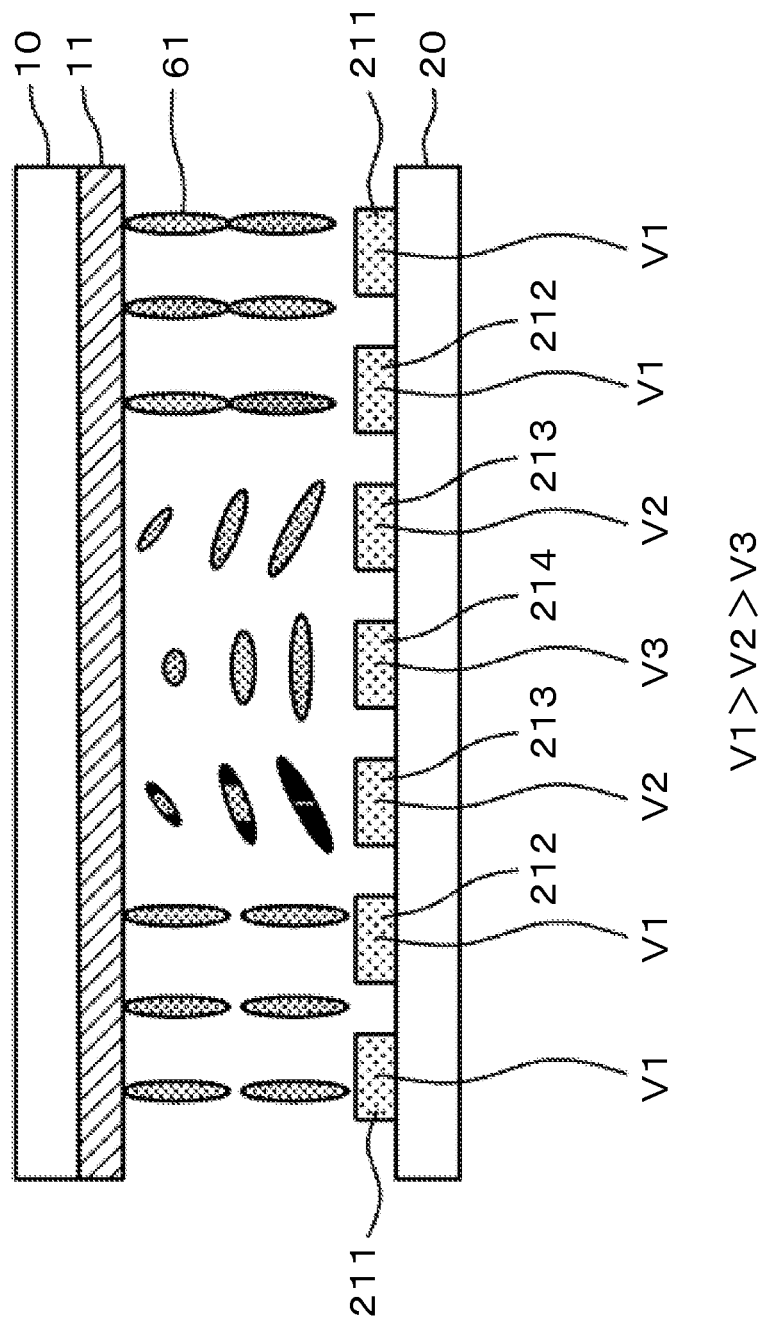
FIG. 1 is a cross sectional view of a liquid crystal lens of a first embodiment of the present invention.

FIG. 1 is a cross sectional view illustrating a configuration of a liquid crystal lens of the present invention. In FIG. 1, a first electrode 11 is formed on a first substrate 10 in a flat solid manner. A second substrate 20 is so-called a multi-electrode in which a plurality of (two or more) second electrodes 21 are formed in one liquid crystal lens. The second electrodes 21 are elongated in a stripe pattern in a vertical direction of the document, and different voltages can be applied to the second electrodes 21. FIG. 1 illustrates a multi-electrode configuration in which voltages applied to the electrodes differ from those of FIG. 19. In FIG. 1, one liquid crystal lens as one unit is formed with seven second electrodes.

In FIG. 1, the outermost second electrode 211 serves as the boundary of one unit of lens. The feature of FIG. 1 is that the maximum voltage V1 is applied not only to the outermost electrodes, but also to the second electrodes 212 arranged on the inside thereof. A voltage V2 lower than V1 is applied to the further inside second electrodes 213, and the lowest voltage V3 is applied to the second electrode 214 arranged around the center of the lens. In this case, the level (high or low) of the voltage applied to the second electrodes 21 indicates the absolute vale of the potential difference from the first electrode 11.

In the configuration of FIG. 1, the following two effects can be attained. As the first effect, at the boundary between lenses, because the shading area by the liquid crystal layer increases, the interference between the lenses can be prevented, and thus preventing the crosstalk due to the interference between the lenses. FIG. 1 illustrates a TN liquid crystal lens, in which the best shading effect can be attained when the maximum voltage is applied.

As the second effect, the transmittance distribution of the liquid crystal lens can be closer to the quadratic curve. The narrow gap is desirable for high-speed responding of the liquid crystal lens. However, it is difficult to realize the narrow gap, because it is necessary to optimize the ratio of the cell gap to the electrode space. According to the present invention, the plurality of second electrodes on both sides are used for forming the shading area, and the plurality of second electrodes on the inside are used for forming the lens. Thus, it is possible to set the diameter of the lens based on the relationship with the gap of the liquid crystal cells in a manner that the transmittance distribution becomes closer to the quadratic curve.

In FIG. 1, the number of the plurality of second electrodes 21 in one lens is seven, but is not limited to seven. That is, the number thereof may arbitrarily be set based on the size of the pixels, the transmittance distribution of the lenses, and the interference prevention of the lenses. In any case, the number of the second electrodes 21 in one lens is two or greater than two.

Figures 2, 3:
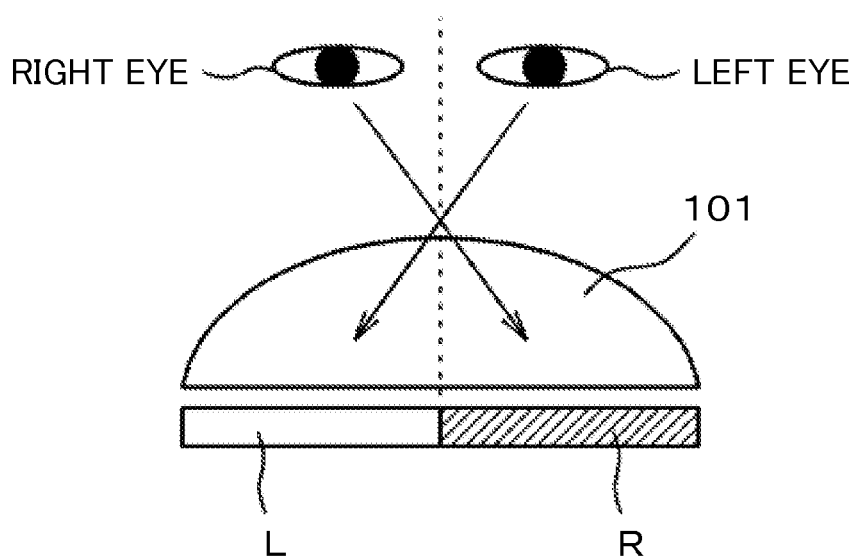
FIG. 2 is a table illustrating effects on crosstalk, according to the present invention.
FIG. 3 is a schematic diagram illustrating an effect of a liquid crystal lens on the front side of the screen, according to the present invention.

FIG. 2 is a graph illustrating a comparison of crosstalk levels in the formation of a three-dimensional image, among a case where the liquid crystal lens of the present invention is used, a case of a single electrode for forming the liquid crystal lens with a pair of the second electrodes, and a case of a multi-electrode of FIG. 19. In FIG. 2, the crosstalk is 1.8% in the case of the single electrode for forming the liquid crystal lens with the pair of the second electrodes, and the crosstalk is 1.2% in the case where the liquid crystal lens is formed with the multi-electrode of FIG. 19. The crosstalk is 0.6% in the case of the liquid crystal lens which is formed with the multi-electrode of the present invention, as illustrated in FIG. 1. In this case, the improvement has been remarkably made as compared to former cases.

Accordingly, the crosstalk is very low in the liquid crystal lens of the present invention, thus realizing a great effect on maintaining the three-dimensional image in the case where the visual line of a viewer has been moved. In the conventional single electrode system, because the position of the lens is fixed, the pixels for right eye and the pixels for left eye are not sufficiently separated, when the visual line has been moved, thus increasing the crosstalk. On the contrary, if the multi-electrode system of the present invention is used, it is possible to change the position of the liquid crystal lens by changing a voltage to be applied to the electrodes. Therefore, the position information of the visual line is acquired, and this is fed back for the applied voltage. As a result, it is possible to display the three-dimensional image whose crosstalk is of equal significance to the image on the front, even if the visual line has been moved.

FIG. 3 is a cross sectional view when the display device is seen through a liquid crystal lens 101 from the front. In FIG. 3, the right eye recognizes an image R for right eye through the liquid crystal lens 101, while the left eye recognizes an image L for left eye through the liquid crystal lens 101, thereby fully recognizing the three-dimensional image. When the visual line has been moved, the crosstalk is generated, if the position of the liquid crystal lens is fixed as is. That is, the liquid crystal lens 101 is formed to be optimized, when the screen is seen from the front. Thus, if the visual line has been moved, optical refraction due to the liquid crystal lens does not have an intended characteristic, thus generating the crosstalk.

Figure 4:
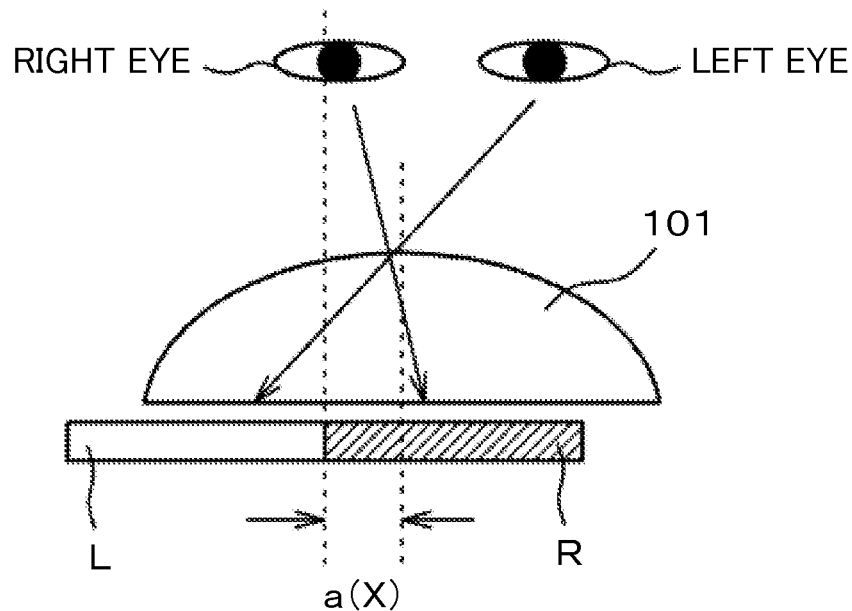
FIG. 4 is a schematic diagram illustrating an effect of the liquid crystal lens of the present invention, when the visual line has been moved.

FIG. 4 is a schematic diagram illustrating a state of recognizing an image in a case where the eye position has been moved (also as a case where the visual line has been moved), according to the present invention. In FIG. 4, when the visual line has been moved by a(x), the liquid crystal lens 101 is moved by a(x) as well. As will be described later, this movement is achieved, by monitoring the eye position using a camera, and feeding back the position information of the eyes to a control circuit which applies a voltage. As a result, the optical refraction by the liquid crystal lens 101 is equal to that when the screen is seen from the surface. Even if the visual line is moved, the crosstalk is not remarkably deteriorated.

Figure 5:
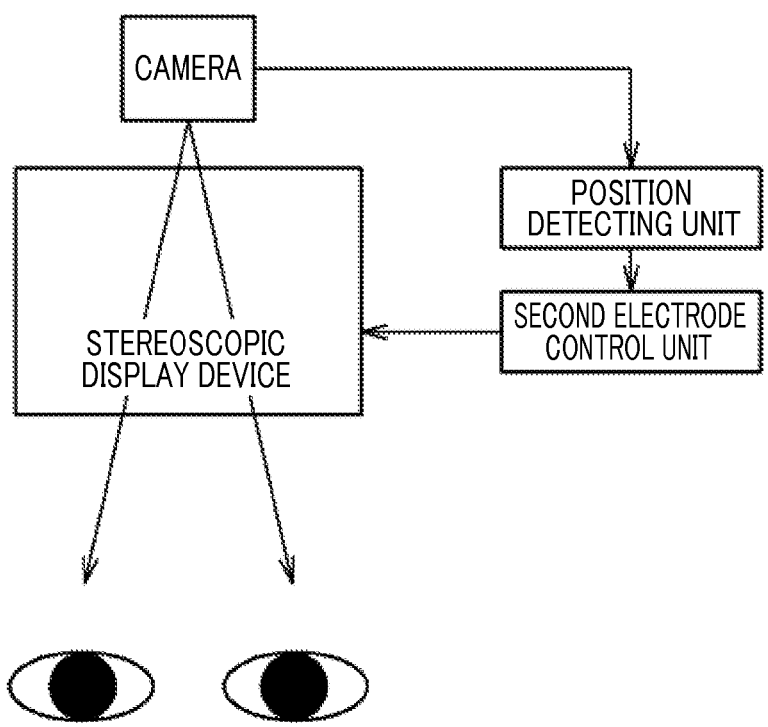
FIG. 5 is a schematic diagram illustrating an eye-tracking system.

FIG. 5 is a schematic diagram illustrating an eye-tracking system. That is, FIG. 5 is a block diagram illustrating a system, which traces the movement of the visual line using a camera and feeds back the data to the display device. In FIG. 5, the positions of human eyes are detected by a camera. This camera is not necessarily an exclusive camera, and may be applied in this system as is, as long as a photographic camera for cell phones or the like is used.

In FIG. 5, the positions of human eyes detected by the camera are input to a position detecting unit, and this signal is input from the position detecting unit to a second electrode control unit. The second electrode control unit generates a signal for controlling the voltage of the plurality of second electrodes on the second substrate of a liquid crystal lens cell. By controlling the voltage to be applied to the second electrodes, the position of the liquid crystal lens is controlled.

Figure 6:
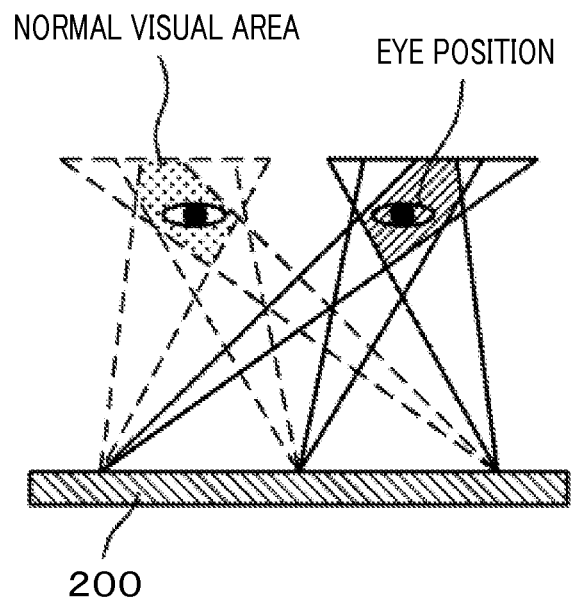
FIG. 6 is a schematic diagram illustrating an effect of the present invention, on the front side of the screen.
Figure 7:
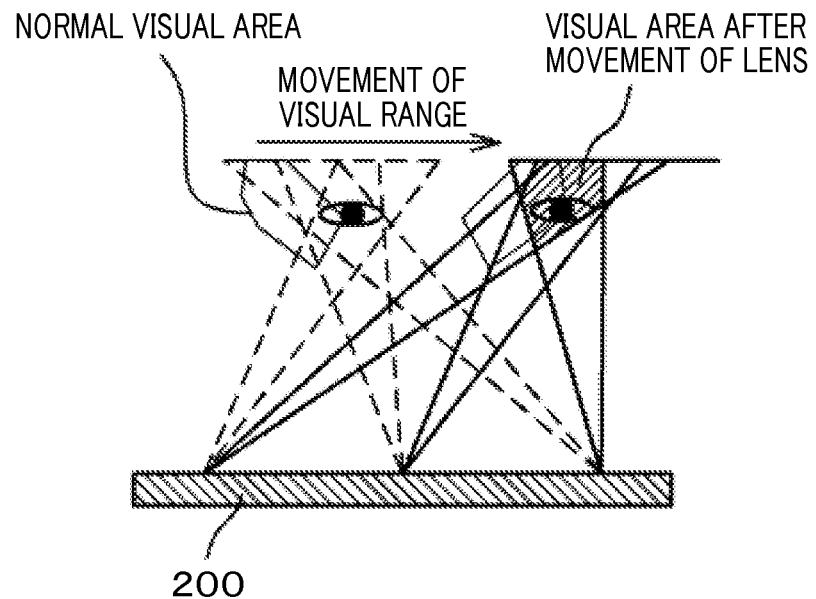
FIG. 7 is a schematic diagram illustrating an effect of the present invention, when the visual line has been moved.

FIG. 6 and FIG. 7 are schematic diagrams each illustrating a state of visual areas in the liquid crystal lens of the present invention, in a case where the visual line is on the front of the screen and in a case where the visual line has been moved from the front. FIG. 6 is a schematic diagram illustrating visual areas in a case where the screen is seen from the front. In FIG. 6, the visual areas are those different pentagons that are shaded and enclose the right eye or left eye. When the crosstalk is zero, the visual area is substantially a point. If a predetermined level of crosstalk is allowed, a predetermined range of visual area is generated. FIG. 6 illustrates a case where the crosstalk of, for example, 5% is allowed.

FIG. 7 is a schematic diagram illustrating a change of the visual area, in a case where the visual line has been moved, in the liquid crystal lens of the present invention. In FIG. 7, the shaded pentagons with different forms represent the visual areas after the visual line has been moved. As obvious from a comparison between FIG. 7 and FIG. 6, according to the present invention, substantially the same visual areas can be maintained as the case where the screen is seen from the front, even if the visual line has been moved. In FIG. 7, those blank pentagons with different forms represent the visual areas before the visual line has been moved.

Figure 8:
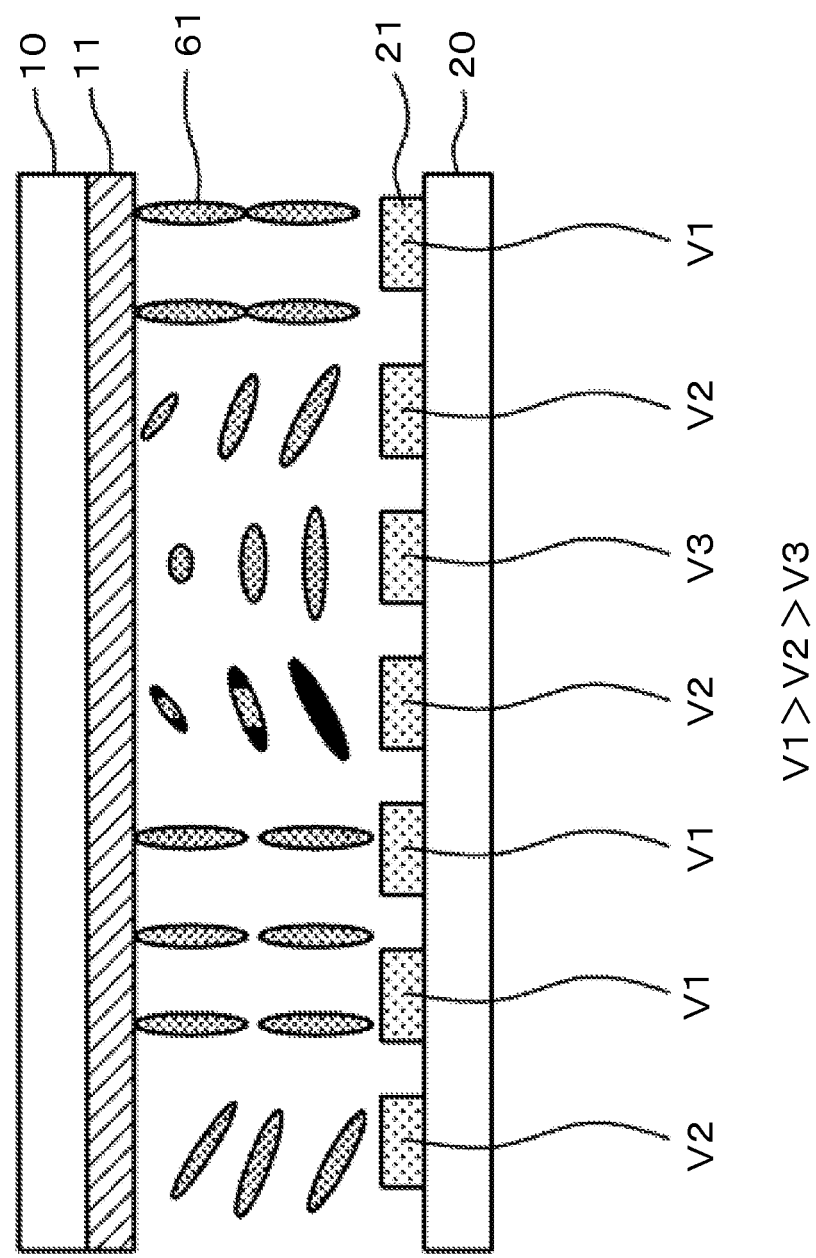
FIG. 8 is a cross sectional view showing application of a voltage to a second electrode, when the position of the liquid crystal lens is moved.

FIG. 1 is a cross sectional view illustrating a configuration of a liquid crystal lens, when the visual line comes from the front. In the present invention, FIG. 8 is a cross sectional view of the case where the position of the liquid crystal lens is changed, by changing the voltage to be applied to the second electrodes 21.

The position of the liquid crystal lens can also be changed by changing the voltage to be applied to the second electrodes, using a multi-electrode system illustrated in FIG. 19. In the multi-electrode system of FIG. 19, the refractive index of the liquid crystal lens is far from the quadratic curve. Thus, even if the position of the liquid crystal lens is changed, it is difficult to maintain the front visual area of the liquid crystal lens. In the multi-electrode system of FIG. 19, the shading area between the liquid crystal lenses is not enough, thus likely generating the crosstalk. Therefore, the multi-lens system of FIG. 19 causes a higher level of crosstalk than the liquid crystal lens of the present invention, when the visual line has been moved.

Second Embodiment

Figure 9:
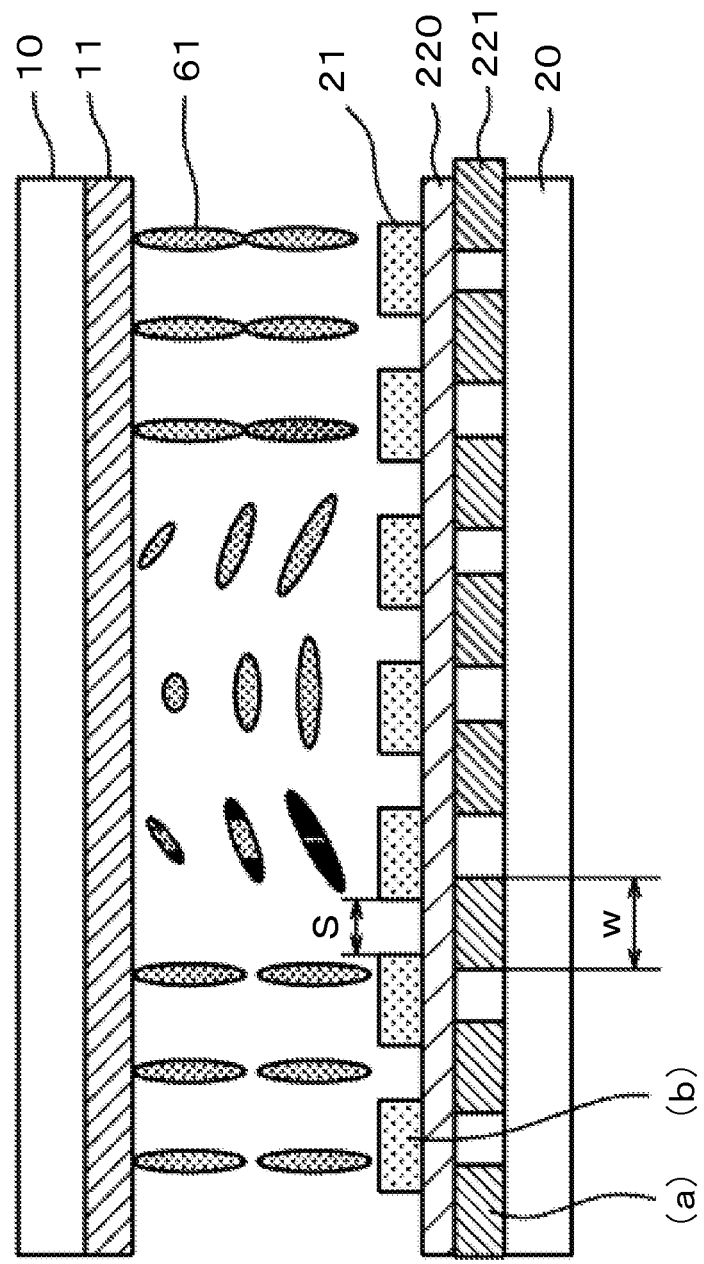
FIG. 9 is a cross sectional view of a liquid crystal lens cell of a second embodiment.
Figure 10:
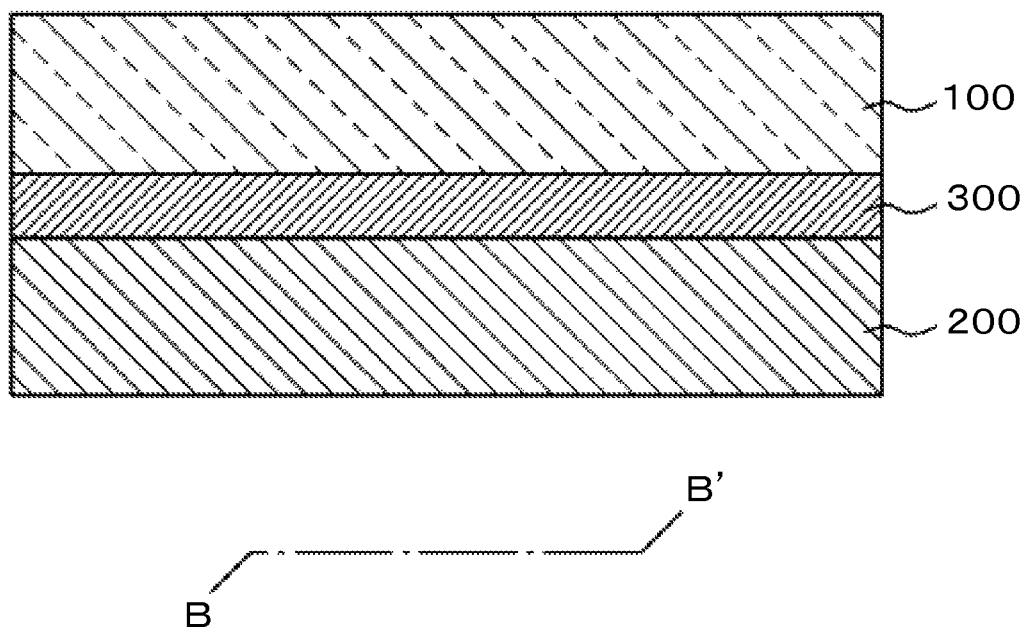
FIG. 10 is a schematic cross sectional view of a three-dimensional display device which uses the liquid crystal lens.
Figure 11A:
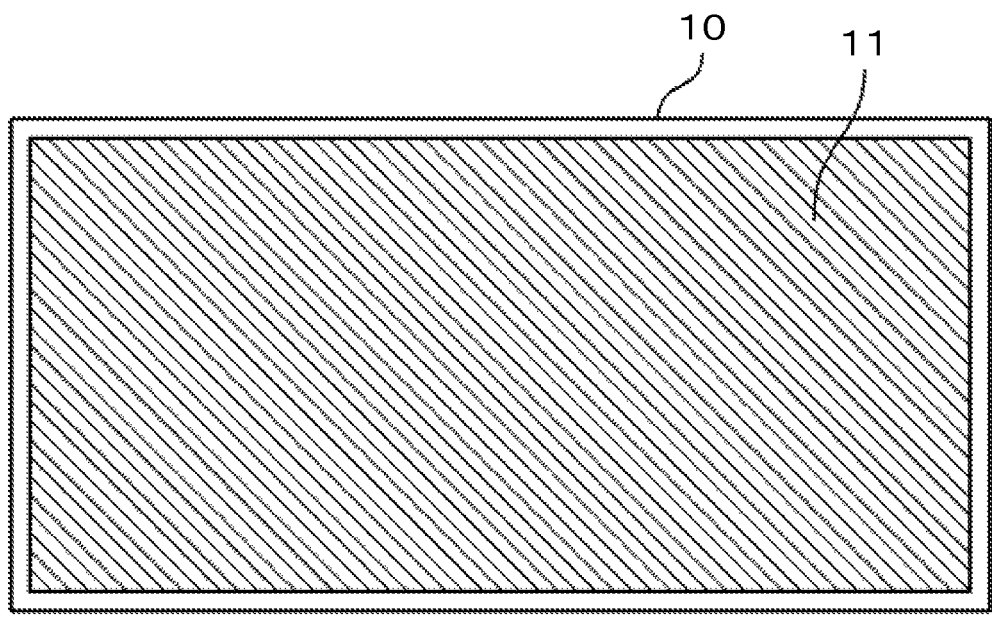
FIGS. 11A and 11B are plan views of a first electrode and the second electrode of the liquid crystal lens.
Figure 11B:
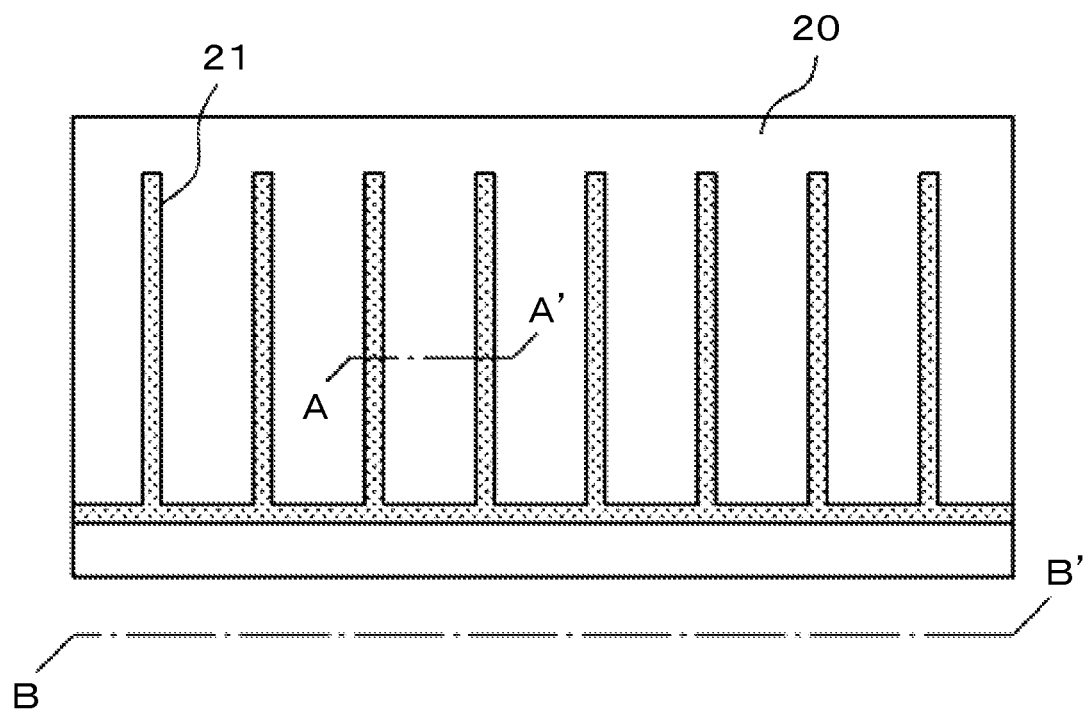
Figure 12:
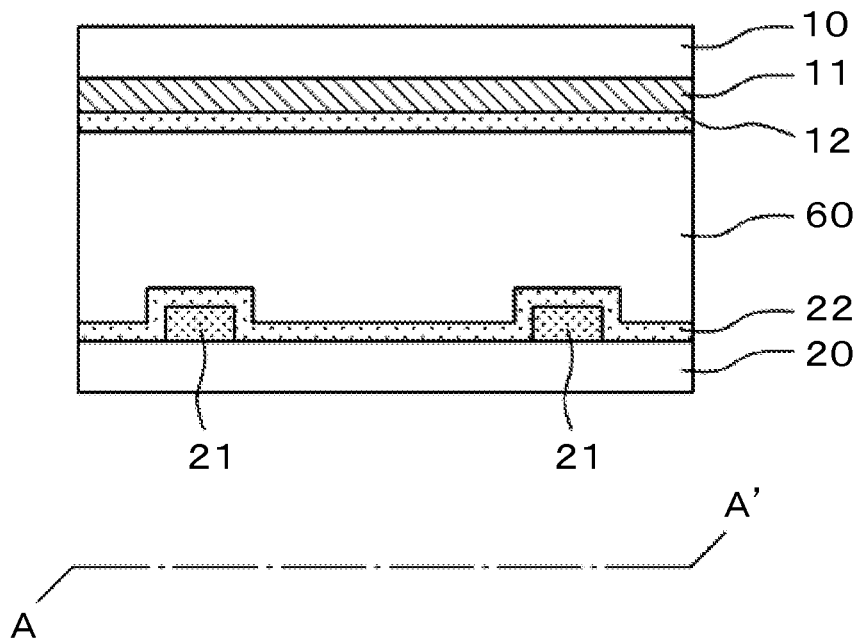
FIG. 12 is a cross sectional view of the liquid crystal lens.
Figure 13:
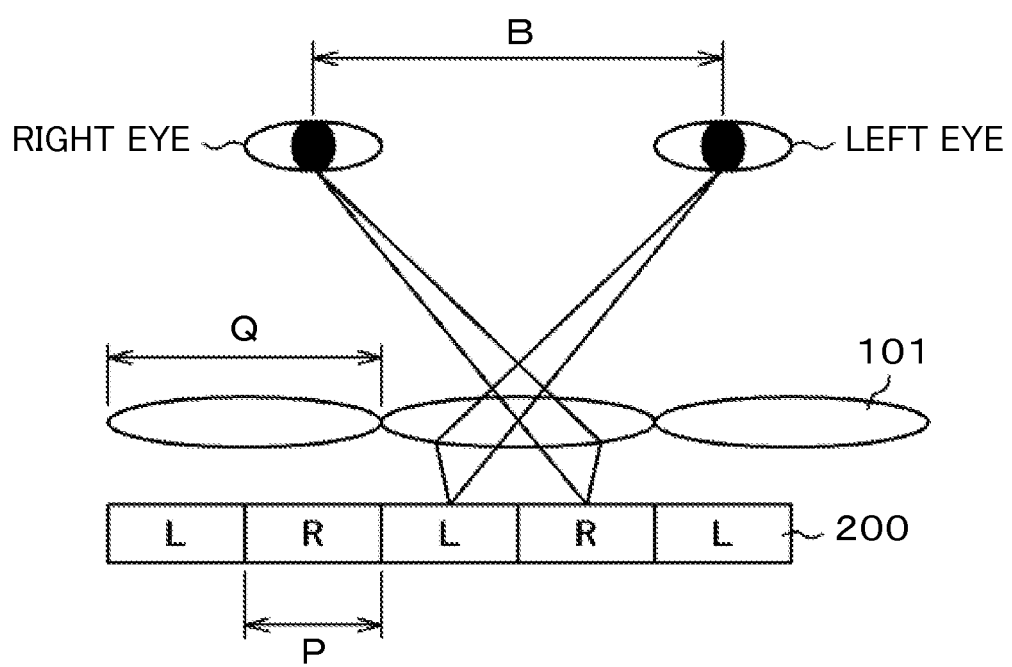
FIG. 13 is a principle diagram of the three-dimensional display device which uses the liquid crystal lens.
Figure 14A:
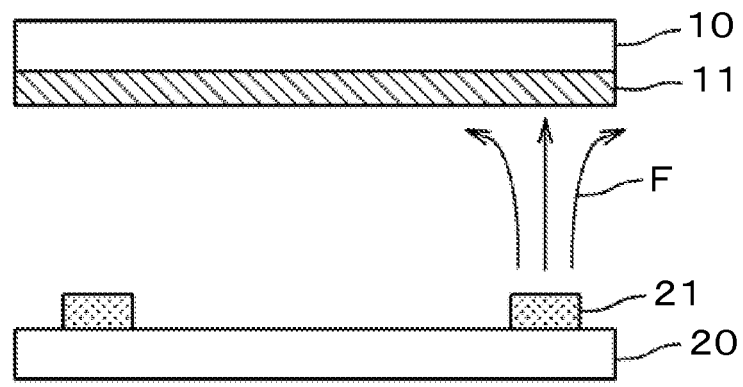
FIGS. 14A, 14B, 14C are cross sectional views each illustrating an operation of a homogeneous-type liquid crystal lens.
Figure 14B:
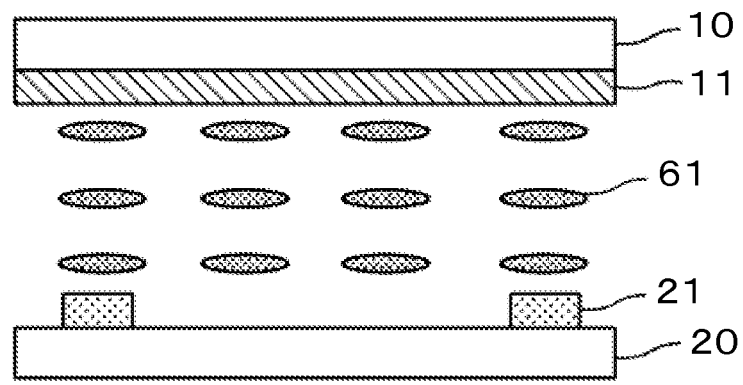
Figure 14C:
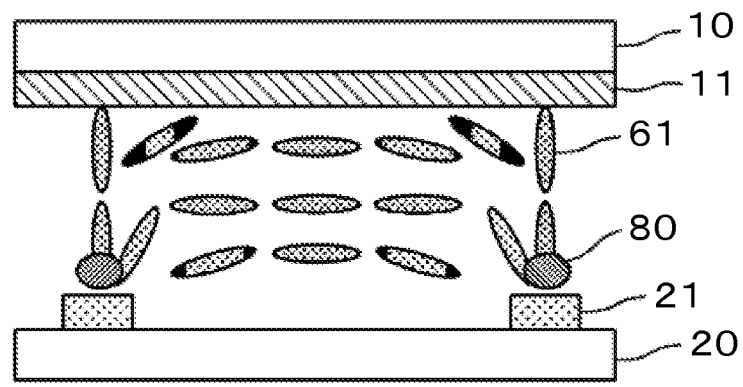
Figure 15A:
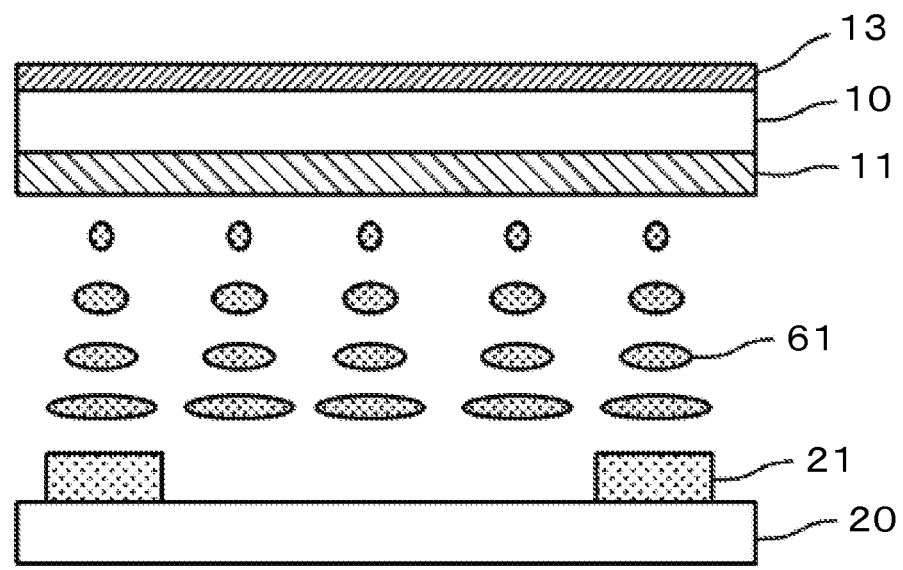
FIGS. 15A and 15B are cross sectional views each illustrating an operation of a liquid crystal lens which uses a TN liquid crystal cell.
Figure 15B:
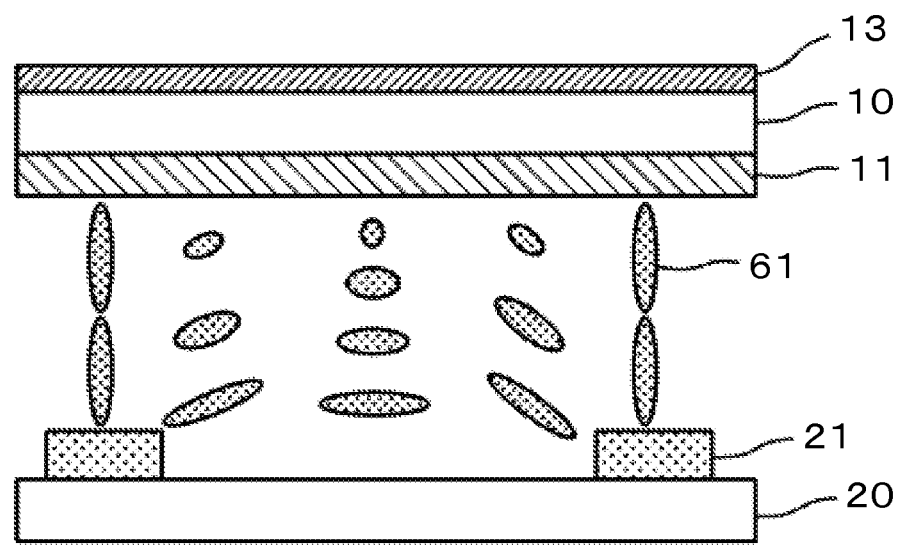
Figure 16A:
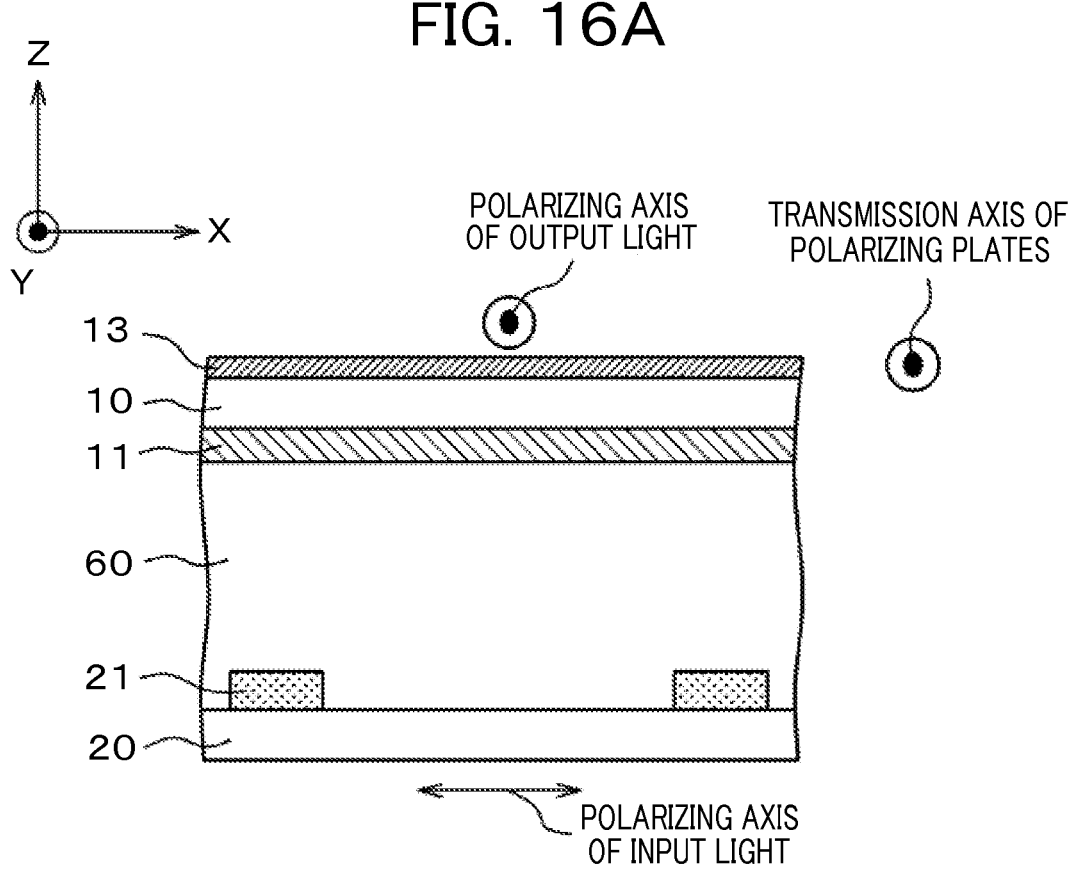
FIGS. 16A, 16B are schematic cross sectional views each illustrating an operation of the liquid crystal lens which uses a TN liquid crystal cell.
Figure 16B:
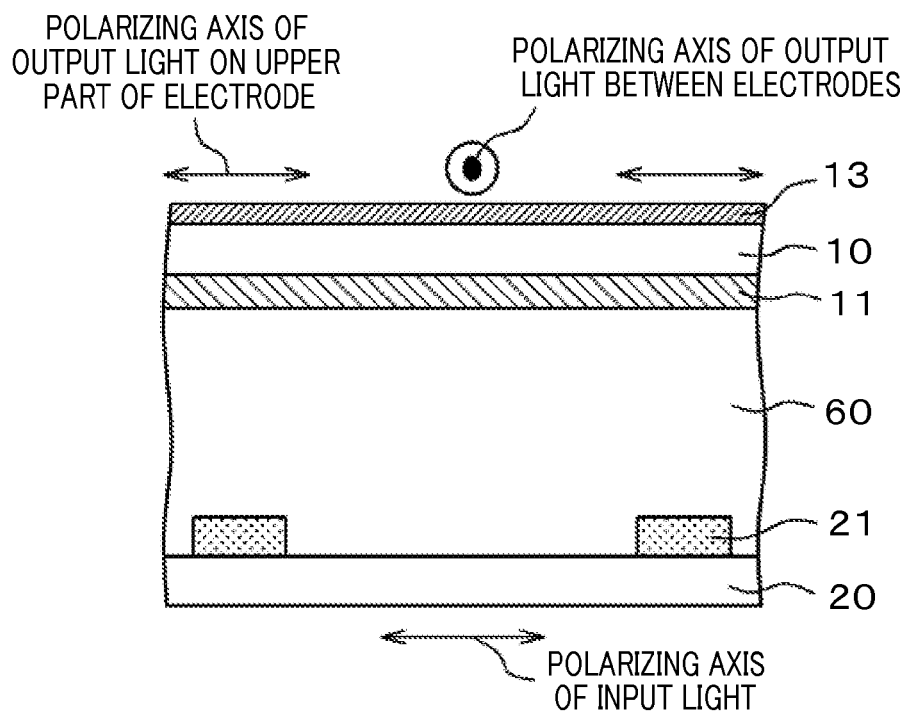
Figure 17:
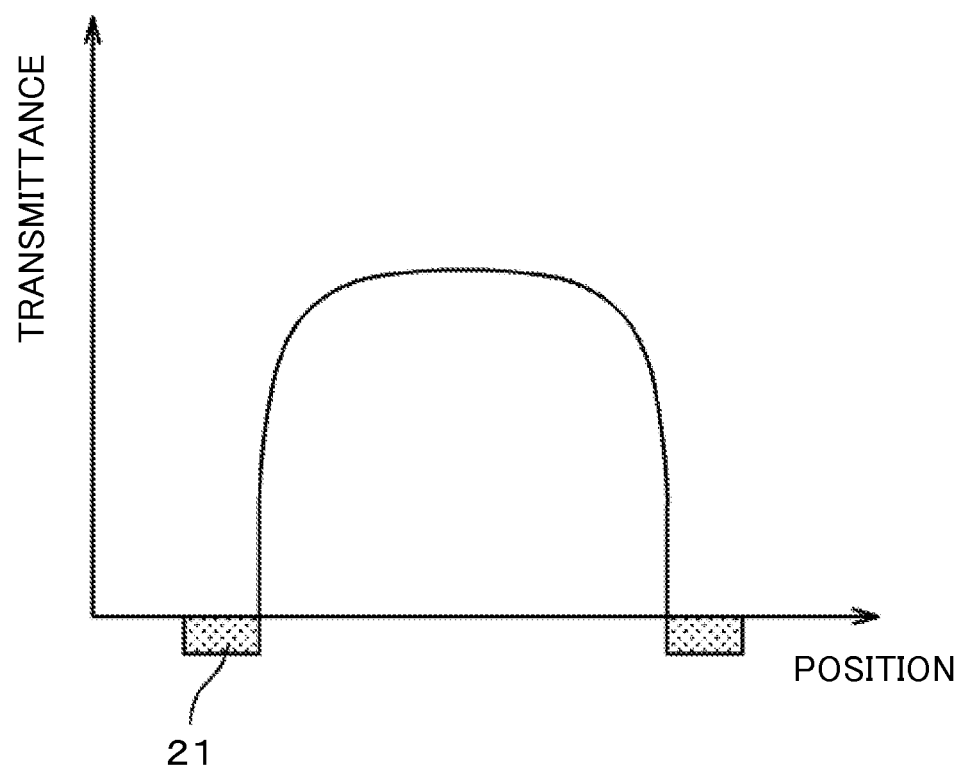
FIG. 17 is a graph illustrating a transmittance distribution of the liquid crystal lens which uses a TN liquid crystal cell.
Figure 18:
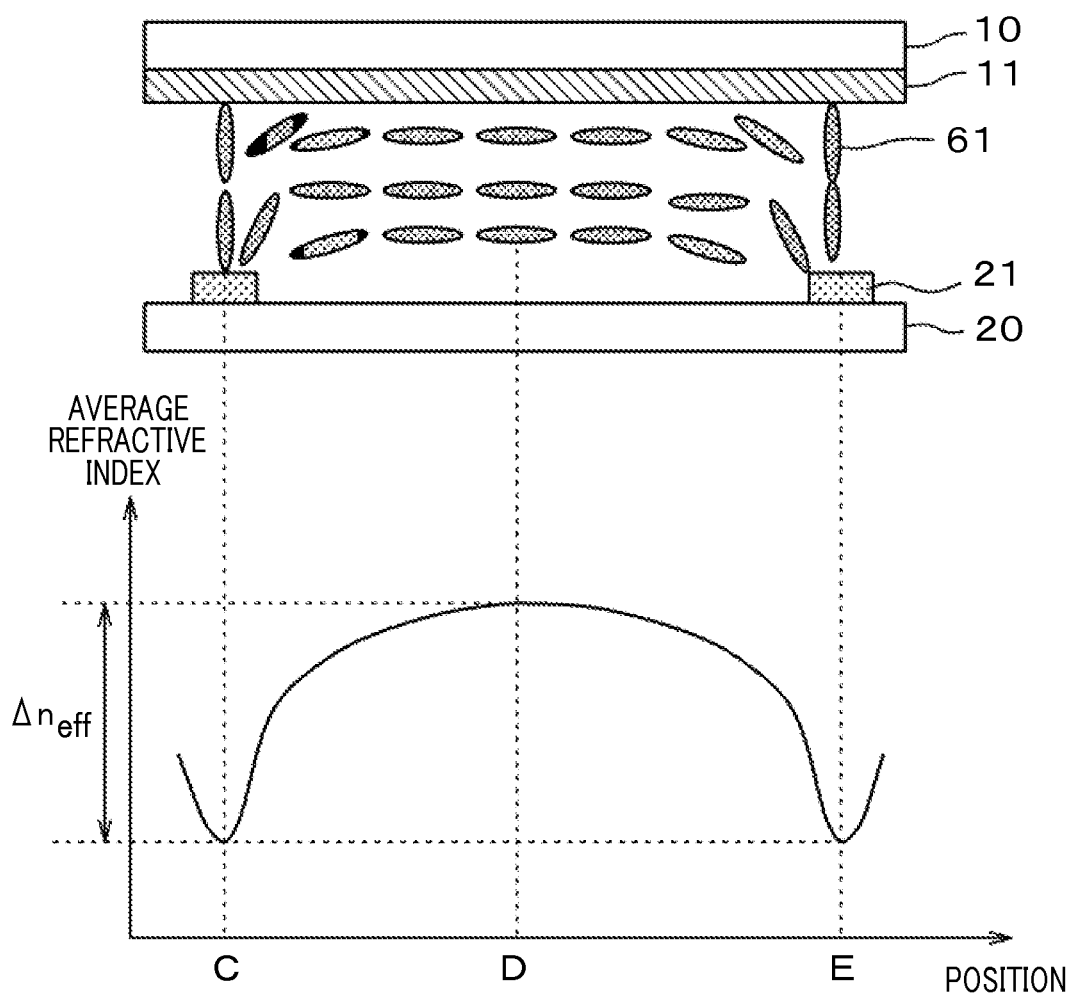
FIG. 18 is a cross sectional view illustrating an aligned state of the liquid crystal lens which is formed with a pair of second electrodes, and shows the refractive index distribution.

FIG. 9 is a cross sectional view of a liquid crystal lens cell according to a second embodiment of the present invention. In FIG. 9, what differs from FIG. 1 is that the second electrodes 21 on the second substrate 20 have a two-layer structure. In FIG. 9, second electrodes 221 as the lower layers are formed below the second electrodes 21 as the upper layers, through an insulating layer 220. In FIG. 9, when the second substrate 20 is seen from the side of the first substrate 10, it is preferred that the spaces between the upper second electrodes 21 be filled with the lower second electrodes 221. That is, when the spaces between the upper second electrodes 21 are identified as "s", and the width of the lower second electrodes 221 is identified as "w", it is preferred that "s≤w". The width of the upper second electrodes 21 is not necessarily the same as the width of the lower second electrodes 221.

In the configuration of FIG. 1, the spaces intervene between the second electrodes 21. Thus, particularly, the line of electric force from the end part of the second electrodes 21 is not vertically extended toward the first electrode 11. This generates a part in which liquid crystal molecules are not entirely aligned in a longitudinal direction. Light leakage may occur in this part. On the contrary, in the present invention of FIG. 9, there is no space on the side of the second electrodes 21, when seen from the side of the first electrode 11. Thus, the line of electric force can easily be controlled. Particularly, in the shading area at the end part of the lens, the line of electric force can vertically be formed toward the first electrode, thus enabling to completely perform shading.

The lower second electrodes 221 apply the maximum voltage V1 to the plurality of second electrodes 221, at the end part of the liquid crystal lens. Other lower second electrodes 221 may apply the same voltage as that for the upper left second electrode 21, or may apply the same voltage as that for the upper right second electrode 21. The electrodes may apply a middle voltage of the upper left and upper right second electrodes 21 of the upper layer. The voltages of the upper second electrodes 21 and the lower second electrodes 221 may be selected in a manner that the refractive index distribution becomes closer to the quadratic curve.

In the above descriptions, the single electrode type liquid crystal lens has been formed using only a pair of second electrodes. However, precisely, needless to say, the liquid crystal lens has been formed using the pair of second electrodes and the first electrode. One multi-electrode type liquid crystal lens has been formed using two or more electrodes. Precisely, however, needless to say, one liquid crystal lens has been formed using two or more second electrodes and the first electrode.

What is claimed is:

1. A display device comprising liquid crystal lens cells are arranged on a display panel,
wherein the liquid crystal cells have a TN type liquid crystal, which is sandwiched between a first substrate and a second substrate and whose twist angle is 90 degrees,
wherein a first electrode is formed in a flat solid manner on a side of the liquid crystal of the first substrate, and a plurality of second electrodes are in a stripe pattern as seen in plane on a side of the liquid crystal of the second substrate,
wherein the plurality of second electrodes extend in a first direction and arranged in a second direction formed on a same layer;
wherein a plurality of liquid crystal lenses are formed in the liquid crystal cells, and each of the plurality of liquid crystal lenses is formed using the first electrode and at least three of the plurality of second electrodes,
wherein each of the at least three of the plurality of second electrodes is applied with different voltages from each other,
wherein the plurality of second electrodes exist at a boundary between a first liquid crystal lens and a second liquid crystal lens, and
wherein the plurality of the second electrodes at the boundary are applied with a maximum voltage among the different voltages.

2. The display device according to claim 1, further comprising:
a position detecting unit which detects positions of human eyes and forms position information; and a second electrode control unit which forms a voltage to be applied to the second electrodes based on the position information.

3. A display devices comprising liquid crystal cells are arranged on a display panel,
   wherein the liquid crystal lens cells have a TN type liquid crystal, which is sandwiched between a first substrate and a second substrate and whose twist angle is 90 degrees,
   wherein a first electrode is formed in a flat solid manner on a side of the liquid crystal of the first substrate, a plurality of upper layer second electrodes are in a stripe pattern as seen in plane on a side of the liquid crystal of the second substrate, and a plurality of lower layer second electrodes are formed below the plurality of upper layer second electrodes through an insulating layer,
   wherein the plurality of upper layer second electrodes extend in a first direction and are arranged in the second direction formed on an upper layer first layer,
   wherein a plurality of lower layer second electrodes extend in a first direction and are arranged in a second direction formed on the lower layer,
   wherein each of the plurality of lower layer second electrodes exists between two of the plurality of upper layer second electrodes, as seen from the first electrode,
   wherein the liquid crystal lens cells include a plurality of liquid crystal lenses, each of the plurality of liquid crystal lenses is formed using the first electrode, at least three upper layer second electrodes and at least three lower layer second electrodes,
   wherein each of the at least three upper layer second electrodes and the at least three lower layer second electrodes is applied with different voltages from each other,
   wherein the plurality of upper layer second electrodes and the plurality of lower layer second electrodes exist at a boundary of a first liquid crystal lens and a second liquid crystal lens,
   wherein the plurality of the upper layer second electrodes and the lower layer second electrodes at the boundary are applied with a maximum voltage among the different voltages.

4. The display device according to claim 3, wherein a space between two of the upper layer second electrodes is filled entirely with the lower layer second electrode, as seen from the first electrode.

5. The display device according to claim 3, wherein a voltage of the lower layer second electrode is equal to a voltage of the upper left upper layer second electrode seen from the lower layer second electrode.

6. The display device according to claim 3, further comprising:
   a position detecting unit which detects positions of human eyes and forms position information; and
   a second electrode control unit which forms a voltage to be applied to the upper layer second electrode and the lower layer second electrode based on the position information.

* * * * *